United States Patent Office 2,734,566
Patented Feb. 14, 1956

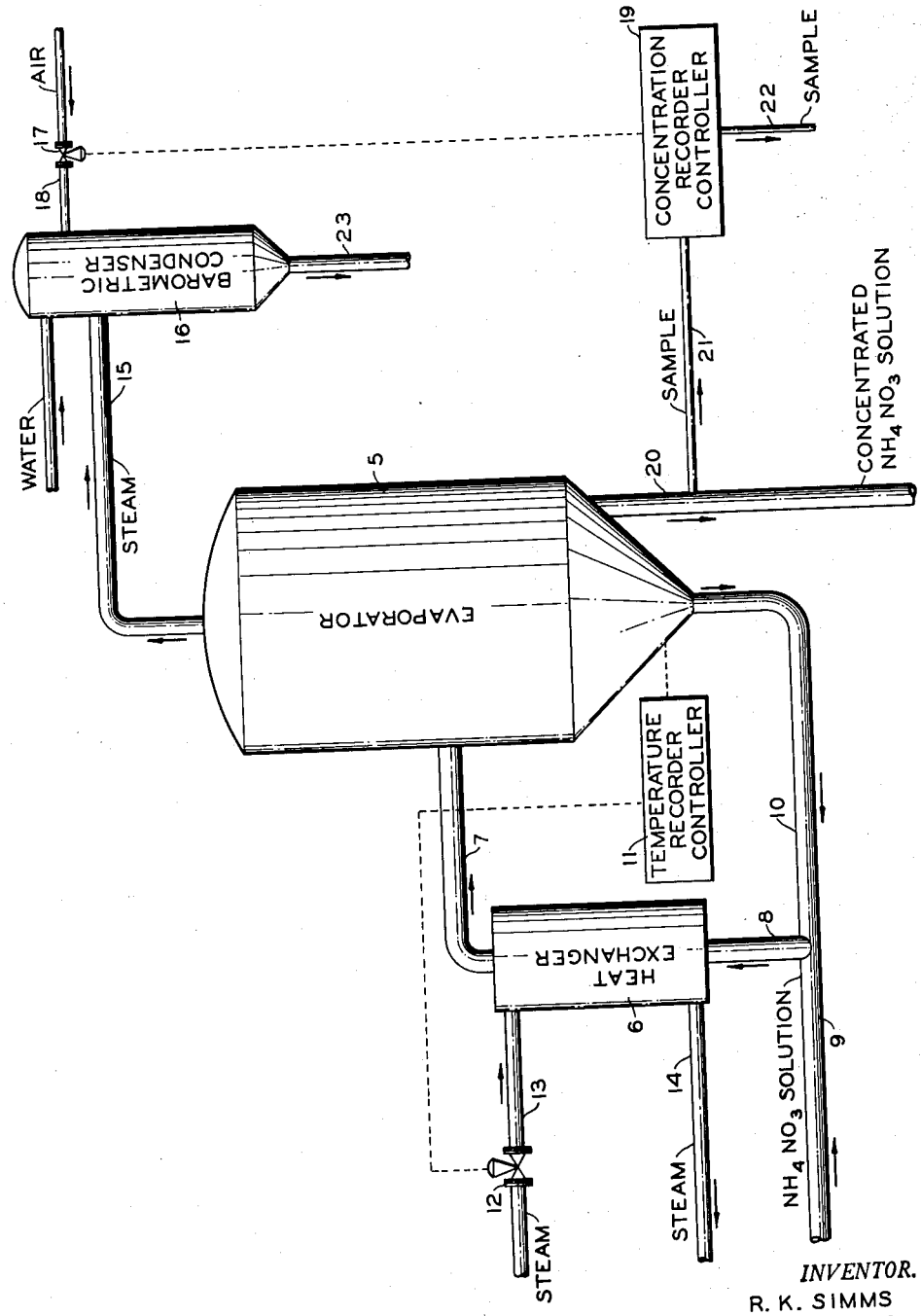

2,734,566

CONCENTRATION OF AMMONIUM NITRATE SOLUTIONS

Russell K. Simms, Bartlesville, Okla., assignor to Phillips Petroleum Company, a corporation of Delaware Application August 20, 1951, Serial No. 242,765

11 Claims. (Cl. 159—44)

This invention relates to an improved method for the concentration of solutions. One aspect of the invention relates to an improved method for concentrating an aqueous ammonium nitrate solution. In a specific embodiment, aqueous ammonium nitrate is concentrated under reduced pressure at constant temperature, and the concentration of the ammonium nitrate solution thus produced is controlled within very narrow limits by controlling the absolute pressure in the evaporator in response to variations in the concentration of the ammonium nitrate solution produced.

It is old in the art to concentrate solutions by evaporation under atmospheric or subatmospheric pressures. The heat necessary for the evaporation may be contained entirely in the feed stock which will flash upon entering a subatmospheric evaporator, or a portion of the heat may be contained in the feed stock and the additional amount necessary added by means of a heat exchanger within the evaporator system. With subatmospheric evaporators, the vacuum can be maintained by a barometric condenser which condenses the vapor being evaporated from the feed stock. Several methods have been used to control the concentration of the solution produced in either the atmospheric or subatmospheric evaporators. These methods include varying the rate of withdrawal of the concentrated solution so as to obtain a solution of the desired concentration, and controlling the amount of heat added to the evaporator, or the temperature, so as to regulate the rate of evaporation and thereby control the concentration of the solution produced. Attempts also have been made to produce a solution of controlled concentration by operating the evaporator at a constant temperature and constant pressure.

There are three operating variables, that is, temperature, pressure, and concentration of the solution, in an evaporating process which can be controlled so as to produce a solution of desired concentration. By fixing the temperature and pressure in the evaporation system, two of the three variables are fixed, and therefore the third variable, i. e., concentration, should also be fixed. In actual practice, however, I find that the concentration of the solution, which is actually the critical factor in an evaporation process, is not fixed by fixing temperature and pressure. As load conditions on the evaporator vary or as the barometric pressure varies, or as the concentration of the entering solution varies, I find that the preselected temperature and pressure are no longer in an equilibrium relationship, and thus the concentration of the solution produced varies even though temperature and pressure are fixed.

According to my invention in preferred embodiment, a solution is evaporated at subatmospheric pressure at a substantially constant temperature, and a solution of predetermined concentration is obtained by controlling the absolute pressure in the evaporator in response to variations in the concentration of the solution produced. By substantially constant temperature I mean a temperature preferably within ±1° C. of the selected temperature. By operating at a constant temperature and by controlling the absolute pressure in the evaporator in response to measurements of the critical factor, that is, the concentration of the solution produced, I am able to avoid the difficulties encountered in the art and to produce a solution of predetermined concentration at a constant rate.

In concentrating aqueous ammonium nitrate solutions for the production of prilled ammonium nitrate, it is very essential that the concentration of the solution which is to be prilled be continuously maintained within a very narrow range, usually within about 94.5 per cent to 96.0 per cent and preferably within the range of 95 to 95.5 per cent ammonium nitrate by weight. Solutions having a concentration outside of this range generally will not produce a satisfactory prill. Therefore my invention is particularly advantageous in the manufacture of ammonium nitrate prills. My invention will therefore be explained with particular reference to the concentration of ammonium nitrate solutions, but it is understood that it is not to be limited to the concentration of such a solution as my invention can also be applied to the concentration of other solutions, for example, ammonium sulfate solutions, brine, sugar solutions, fruit juice, and the like.

An object of my invention is to provide an improved method for concentrating solutions.

Another object of my invention is to provide a method for concentrating an aqueous salt solution so as to produce a salt solution of controlled uniform concentration.

Another object of my invention is to provide a method for concentrating an ammonium nitrate solution so as to produce a solution of controlled uniform concentration continuously.

It is a further object of my invention to provide a method for controlling a subatmospheric pressure evaporator so as to produce an ammonium nitrate solution of predetermined concentration.

Another object of my invention is to provide a method for concentrating an ammonium nitrate solution suitable for use in prilling operations.

Another object of my invention is to provide a method for the continuous production of an ammonium nitrate solution suitable for use in prilling operations.

Other objects will be apparent to those skilled in the art upon reading the discussion and disclosure herein given.

In a preferred embodiment of my invention, aqueous ammonium nitrate solution is continuously introduced into an evaporator operating at a substantially constant temperature and subatmospheric pressure, the reduction in pressure being supplied by a barometric condenser condensing the effluent steam from the evaporator. Concentrated ammonium nitrate solution is continuously withdrawn from the evaporator and a portion thereof analyzed for concentration, and the absolute pressure in the evaporator automatically controlled in response to variations in the measured concentration.

My invention can be more fully understood by referring to the accompanying drawing which is a schematic flow diagram of one embodiment of my invention which is particularly adapted to the concentration of ammonium nitrate solutions for use in prilling operations. Various pieces of auxiliary equipment such as valves, pumps, and the like, have been omitted for the sake of clarity. Although the drawing will be described with particular reference to the concentration of ammonium nitrate solutions, it will be understood that my invention is also applicable to other solutions hereinbefore mentioned.

In the drawing, dilute ammonium nitrate solution is introduced into evaporator 5 via line 9, line 8, heat exchanger 6, and line 7. Heat exchanger 6 can be of conventional design, and the supplying of a suitable exchanger is well within the skill of the art. Steam is introduced into heat exchanger 6 through line 13, and steam and/or condensate is withdrawn therefrom via line 14. A positive circulation of ammonium nitrate solution is maintained in the evaporator by recycling a portion of the solution from evaporator 5 through line 10, line 8, heat exchanger 6, and line 7. This positive circulation, which is accomplished by means of a thermal siphon effect, aids in the control of the temperature in the evaporator. The temperature in evaporator 5 is automatically controlled by temperature recorder-controller 11 which operates motor valve 12 in steam line 13 in response to variations of temperature in evaporator 5 so as to regulate the amount of steam being supplied to heat exchanger 6, and thereby controls the temperature of the ammonium nitrate solution in evaporator 5. In the case of ammonium nitrate solutions being concentrated for use in prilling operations, a temperature in the range of 130 to 140° C. at an absolute pressure in the range of 200 to 250 mm. of mercury is preferred. Temperature recorder-controller 11 can be of conventional design, and the supplying of a suitable instrument is well within the skill of the art. Concentrated ammonium nitrate solution is withdrawn from evaporator 5 through line 20. Effluent steam is withdrawn from the evaporator via line 15 and condensed in barometric condenser 16 having a barometric leg indicated diagrammatically at 23, thereby providing a reduced or subatmospheric pressure in evaporator 5. I prefer to maintain a pressure in the range of 200 to 250 mm. mercury in the evaporator when preparing an ammonium nitrate solution for use in prilling operations. A suitable condenser is described in "Steam, Air and Gas Power" by W. H. Severus and H. E. Degler, third edition, 1939, at pages 338 and 339. Concentrated ammonium nitrate solution is withdrawn from line 20 by means of line 21 and analyzed for concentration in concentration analyzer-recorder-controller 19, and passes therefrom by means of line 22. It is within the scope of this invention to withdraw the solution to be measured for concentration either continuously or intermittently. Air is bled into barometric condenser 16 through line 18, the amount of air being automatically regulated by motor valve 17 operating in response to variations in concentration of the ammonium nitrate solution as measured by concentration recorder-controller 19. At equilibrium conditions, motor valve 17 is partially open allowing air to bleed continuously into the evaporation system at a controlled rate so as to maintain a substantially constant absolute pressure in evaporator 5. By system I mean one or more of evaporator 5, line 15, or condenser 16.

If the concentration of the product ammonium nitrate solution falls below the selected value, concentration recorder-controller 19 activates motor valve 17 so as to move the valve toward a closed position in air line 18, thereby decreasing the amount of air being bled into the system and thus reducing the pressure in the evaporator. Since the evaporator is operated at a substantially constant temperature, the reduction in pressure just described results in an increased rate of evaporation of water from the ammonium nitrate solution. As the rate of evaporation increases, the product solution increases in concentration until the concentration of the solution, as measured by concentration recorder-controller 19, returns to the selected value. If the concentration of the ammonium nitrate solution rises above the selected value, concentration recorder-controller 19 activates motor valve 17 so as to move the valve toward an open position in air line 18 and thereby allows more air to be bled into the condenser, thereby increasing the pressure in the evaporator. Since the evaporator is operated at a substantially constant temperature, the increase in absolute pressure in the evaporator decreases the rate of evaporation of water from the ammonium nitrate solution. As the rate of evaporation decreases, product ammonium nitrate solution being withdrawn from the evaporator becomes less concentrated until the concentration of the solution, as measured by concentration recorder-controller 11, returns to the selected value. Thus, by controlling the absolute pressure in the evaporator in response to variations in concentration of the product ammonium nitrate solution, an ammonium nitrate solution of a predetermined concentration can be produced, and further this concentration can be controlled within a very narrow range.

Concentration recorder-controller 19 can be any suitable instrument which measures a property of a solution, which property varies in proportion to the concentration of the solution. For example, a recording-controlling gravitometer can be used to measure the density of the solution at a given temperature, and the air supplied to condenser 16 via line 18 can be regulated by operating motor valve 17 in response to variations in the measured density. When using such an instrument, if the density of the product ammonium nitrate solution, as measured by the gravitometer, rises above a predetermined value (this predetermined density being the density of a solution of the desired concentration), indicating too high a concentration, the gravitometer actuates motor valve 17 so as to move the valve toward an open position in air line 18, thereby increasing the amount of air being bled into the system such that the pressure in the evaporator is increased, thus decreasing the rate of evaporation of water from the solution. As the rate of evaporation is decreased, product ammonium nitrate solution being withdrawn from evaporator 5 becomes more dilute. This decrease in concentration continues until the concentration of the solution returns to the selected value. Conversely, if the density of the ammonium nitrate solution falls below the predetermined value, indicating too low a degree of concentration, the gravitometer actuates motor valve 17 so as to move the valve toward a closed position in air line 18, thereby decreasing the amount of air being bled into the system and thus decreasing the pressure in the evaporator, with the result that the product ammonium nitrate solution increases in concentration and returns to the selected value. A gravitometer suitable for this purpose is described in copending coassigned application, Serial No. 623,148, filed October 18, 1945, by Clyde P. Stanley et al., and in the case of ammonium nitrate solutions would be preferably steam jacketed to prevent solidification of the ammonium nitrate solution, and would be fabricated from stainless steel to resist the corrosive action of the solution.

An alternative instrument which can be used to control the absolute pressure in the evaporator is a recording-controlling viscosimeter which measures the viscosity of the solution and thereby indicates its concentrations. A suitable viscosimeter for measuring the viscosity of solutions and thereby controlling the absolute pressure in the evaporator according to my invention comprises a container for receiving the sample solution and maintaining it at a constant temperature and an impelling or stirring device in the container for stirring the sample solution. The impeller is driven by a constant speed electric motor and the power required to drive the motor is measured by an ammeter. When the solution is at the desired concentration, the viscosity of the solution, as indicated by the power required to drive the motor at a constant speed, is at a predetermined value. It is apparent that if the solution increases in viscosity (indicating an increase in concentration), the power required to maintain the motor running at constant speed increases. Conversely if the viscosity of the solution decreases, the power required to maintain the motor at constant speed decreases. Thus a measurement of the power required to maintain the motor at a constant speed can be used to operate motor valve 17 and regulate the amount of air bled into the condenser so as to control the absolute pressure in the evaporator in response to variations in concentration of the solution. When the viscosity of the concentrated ammonium nitrate solution, as measured by the viscosimeter, rises above a predetermined value (this predetermined viscosity being the viscosity of a solution of the desired concentration), indicating too high a concentration in the product solution, the viscosimeter actuates motor valve 17 so as to move the valve toward an open position in air line 18, thereby allowing more air to bleed into the system so as to increase the pressure in the evaporator with the result that the concentration of the solution returns to the desired value as hereinabove described in reference to the use of a gravitometer. Conversely, when the viscosity of the concentrated ammonium nitrate solution falls below the predetermined value, indicating a low concentration of solution, the viscosimeter actuates motor valve 17 so as to move the valve toward a closed position in air line 18, thereby decreasing the amount of air being bled into the system so as to decrease the pressure in the evaporator and thereby increase the rate of evaporation of water from the solution and return the concentration to the desired value as above described.

Still another method for measuring the concentration of the product ammonium nitrate solution and thereby controlling the absolute pressure in the evaporator is by determining the fudge point or mush point of the solution and controlling motor valve 17 in response to variations in the said fudge or mush points. By "fudge point" as used herein I mean that temperature when cooling a concentrated aqueous solution of ammonium nitrate at which the nuclei of ammonium nitrate crystals just begin to form, and by "mush point" as used herein I mean that temperature at which the mixture of ammonium nitrate and solution becomes mushy. In general there are two types of cooling curves for a concentrated aqueous solution of ammonium nitrate. The first type is characterized by two breaks in the curve and the second by only one break. Usually the first break in the former type curve is referred to as the "fudge point" and the second break therein referred to as the "mush point." In the latter type of curve the fudge and mush points occur at the same temperature. The terms "fudge point" and "mush point," however, have no generally accepted meaning in the art and their definitions may vary. However, the fudge and mush points of a solution as herein defined are in a general way proportional to the concentration of the solution, i. e., as the concentration increases the temperature of the fudge and mush points increase. The fudge point temperature does not vary at the same rate as the mush point temperature with changes in the concentration of ammonium nitrate. The fudge point or mush point temperatures of a solution of desired concentration can readily be determined by one skilled in the art. If the fudge point or mush point temperatures are above the predetermined values corresponding to the desired concentration, indicating too high a concentration, motor valve 17 is moved toward an open position to increase the amount of air being bled into the system and thereby increase the absolute pressure in the evaporator. Since the evaporator is maintained at a substantially constant temperature, the increase in pressure reduces the rate of evaporation of water from the solution and the concentration of the product solution returns to the selected value as hereinbefore described. Conversely, if the fudge point or mush point temperatures of the solution are below the predetermined values corresponding to the desired concentration, the product solution is too dilute, and motor valve 17 is moved toward a closed position to decrease the amount of air being bled into the system and thereby decrease the absolute pressure in the evaporator. Since the evaporator is maintained at a substantially constant temperature, the decrease in pressure increases the rate of evaporation of water from the solution, and the concentration of the product solution returns to the desired value.

It will be apparent that other properties and instruments for measuring same can be used to determine the concentration of the product solution, and thereby control the absolute pressure in a constant temperature evaporator in response to variations in the measured concentration so as to produce a solution of controlled concentration according to my invention. Therefore, I do not desire the invention to be limited in its broadest aspects to the specific instruments, solutions, properties, materials of construction, and the like, herein referred to for purposes of explanation, as various changes in such specific details can be made by one skilled in the art without departing from the spirit and scope of this invention.

I claim:

1. A process for the concentration of a solution, which comprises, continuously introducing a solution into an evaporation zone, regulating the heat supplied to said evaporation zone to provide a substantially constant temperature therein, continuously withdrawing a concentrated solution from said evaporation zone, producing an output impulse representative of the concentration of said concentrated solution, and automatically controlling the absolute pressure in said evaporation zone in response to variations in said output impulse so as to maintain said output impulse at a predetermined value, and produce a solution of a predetermined concentration.

2. A process for the concentration of an aqueous salt solution, which comprises, continuously introducing an aqueous salt solution into an evaporation zone, regulating the heat supplied to said evaporation zone to provide a substantially constant temperature therein, evaporating water from said aqueous salt solution in said evaporation zone so as to produce a concentrated salt solution, withdrawing effluent steam from said evaporation zone and condensing same so as to produce a subatmospheric pressure in said evaporation zone, continuously withdrawing said concentrated salt solution from said evaporation zone, producing an output impulse representative of the concentration of said withdrawn concentrated salt solution, and automatically controlling the absolute pressure in said evaporation zone by admitting air into the evaporation system to increase the pressure in response to variations in said output impulse so as to produce a salt solution of predetermined concentration.

3. An evaporation process for the production of an aqueous salt solution of predetermined concentration from a dilute aqueous salt solution, which comprises, continuously passing said dilute salt solution through a heat exchanging zone and into an evaporation zone, automatically regulating the heat supplied to said heat exchanging zone in response to the temperature in said evaporation zone to maintain said evaporation zone at a substantially constant temperature, evaporating water from said dilute salt solution, withdrawing effluent steam from said evaporation zone and condensing same in a condensing zone so as to produce a subatmospheric pressure in said evaporation zone by barometric condensation, admitting a controlled amount of air into said condensing zone, continuously withdrawing a concentrated salt solution from said evaporation zone, producing an output impulse representative of the concentration of said concentrated salt solution, and automatically controlling the absolute pressure in said evaporation zone by regulating the amount of said air admitted into said condensing zone in response to variations in said output impulse to provide said predetermined concentration of said concentrated salt solution.

4. An evaporation process for the production of a concentrated aqueous ammonium nitrate solution of predetermined concentration from a less concentrated aqueous ammonium nitrate solution, which comprises, continuously passing said less concentrated ammonium nitrate solution through a heat exchanging zone and introducing same into an evaporation zone, recycling a portion of the ammonium nitrate solution from said evaporation zone through said heat exchanging zone into admixture with said less concentrated ammonium nitrate solution and back to said evaporation zone, automatically regulating the heat supplied to said heat exchanging zone in response to the temperature in said evaporation zone to maintain a substantially constant temperature in said evaporation zone, evaporating water from the aqueous ammonium nitrate solution in said evaporation zone, condensing effluent steam from said evaporation zone in a barometric condensing zone so as to maintain a subatmospheric pressure in said evaporation zone, admitting a controlled amount of air into said condensing zone, continuously withdrawing a concentrated ammonium nitrate solution from said evaporation zone, producing an output impulse representative of the concentration of said ammonium nitrate, and automatically regulating the amount of said air admitted into said condensing zone in response to variations in said output impulse to increase the absolute pressure in said evaporation zone and provide an ammonium nitrate solution of predetermined concentration.

5. A process according to claim 4 wherein said predetermined concentration is in the range of 95 to 95.5 weight per cent, said substantially constant temperature is in the range of 130° to 140° C., and said subatmospheric pressure is in the range of 200 to 250 millimeters of mercury.

6. A process according to claim 4 wherein said analyzing is effected by measuring the density of said concentrated solution.

7. A process according to claim 4 wherein said analyzing is effected by measuring the viscosity of said concentrated solution.

8. A process according to claim 4 wherein said analyzing is effected by measuring the fudge point of said concentrated solution.

9. A process according to claim 4 wherein said analyzing is effected by measuring the mush point of said concentrated solution.

10. The process for continuously producing a solution of constant concentration which comprises continuously introducing said solution into an evaporation zone, regulating the heat supplied to said evaporation zone to provide a substantially constant temperature therein which causes evaporation of said solution, continuously withdrawing a sample of the concentrated solution, producing an output impulse representative of the concentration of the withdrawn sample, and varying the absolute pressure in said evaporation zone in response to variations in said output impulse so as to maintain said output impulse at a preselected value, and thus maintain the concentration of the sample at a preselected value.

11. The process of claim 10 wherein the pressure in the evaporation zone is decreased when the concentration of the sample is below the preselected value and increased when the concentration of the sample is above said preselected value.

References Cited in the file of this patent

UNITED STATES PATENTS

| | | |
|---|---|---|
| 1,317,488 | Garrigue | Sept. 30, 1919 |
| 1,508,130 | Sanger | Sept. 9, 1924 |
| 1,734,699 | Wait | Nov. 5, 1929 |
| 1,873,329 | Ritchie et al. | Aug. 23, 1932 |
| 2,073,825 | Beck et al. | Mar. 16, 1937 |
| 2,551,569 | Strelzoff | May 1, 1951 |

FOREIGN PATENTS

| | | |
|---|---|---|
| 493 of 1926 | Australia | June 29, 1926 |
| 382,235 | Great Britain | Oct. 20, 1932 |